United States Patent [19]

Kent, Jr

[11] 4,243,781

[45] Jan. 6, 1981

[54] PROCESS FOR THE PREPARATION OF STYRENE AND ACRYLONITRILE CONTAINING POLYMERS

[75] Inventor: Raymond W. Kent, Jr, Midland, Mich.

[73] Assignee: The Dow Chemical Company, Midland, Mich.

[21] Appl. No.: 51,940

[22] Filed: Jun. 25, 1979

[51] Int. Cl.$^3$ ............................................. C08F 2/00
[52] U.S. Cl. ...................................... 526/68; 526/67; 526/77
[58] Field of Search ............................. 526/77, 67, 68

[56] References Cited

U.S. PATENT DOCUMENTS

| | | | |
|---|---|---|---|
| 2,769,804 | 11/1956 | Hansen | 526/64 |
| 2,853,476 | 9/1958 | Kennedy et al. | 526/77 |
| 2,989,517 | 6/1961 | Hanson et al. | 526/68 |
| 3,356,660 | 12/1967 | Moritz et al. | 526/77 |
| 4,061,858 | 12/1977 | Wild et al. | 526/77 |

*Primary Examiner*—William F. Hamrock
*Attorney, Agent, or Firm*—R. B. Ingraham

[57] ABSTRACT

A process is disclosed for the preparation of styrene and acrylonitrile containing polymers wherein styrene and acrylonitrile in a predetermined ratio are introduced continuously into a recirculating polymerization zone of generally constant composition wherein a portion of the styrene and acrylonitrile is polymerized, material is removed from the polymerization zone at a rate equal to the addition of styrene and acrylonitrile on removal from the polymerization zone the monomer being separated from the resulting polymer, the improvement being maintaining a level of oxygen in the styrene and acrylonitrile not greater than 20 parts per million by weight based on the weight of the styrene and acrylonitrile. The resultant polymer is generally colorless.

8 Claims, No Drawings

PROCESS FOR THE PREPARATION OF STYRENE AND ACRYLONITRILE CONTAINING POLYMERS

Styrene and acrylonitrile polymers have found wide acceptance and are used for many applications wherein it is desired to have a colorless or generally colorless polymer. Styrene and acrylonitrile polymers have a natural tendency to assume a yellowish cast as conventionally manufactured. A particularly desirable method for the manufacture of styrene and acrylonitrile containing polymers is by the so-called recirculating coil process such as is described in U.S. Pat. No. 2,769,804 to A. W. Hanson and U.S. Pat. No. 2,989,517 to Hanson et al. the teachings of which are herewith incorporated by reference thereto. For many applications depending upon the color of the article desired, a slight yellowish cast in the unfilled and unpigmented polymer is of little or no significance. However, for many applications it is desirable that the styrene and acrylonitrile polymer be generally colorless as a polymer having a yellow cast may require individual color matching of polymer if the yellow cast varies from batch to batch.

It would be desirable if there were available an improved method for the preparation of a styrene and acrylonitrile containing polymer which could be considered generally colorless.

It would also be desirable to provide improved styrene- acrylonitrile polymers which exhibit a reduced tendency to form a yellow cast during manufacture thereof.

These benefits and other advantages in accordance with the present invention are achieved in a method for the preparation of styrene and acrylonitrile containing polymers wherein a feed stream comprising styrene and acrylonitrile is introduced into a recirculating polymerization zone to form a polymerizing mass, the polymerizing mass being of generally constant composition, removing a portion of the polymerizing mass from the polymerization zone, separating volatile components from the mass to thereby recover a styrene and acrylonitrile containing polymer therefrom and returning at least a portion of the volatile components to the polymerization zone, the improvement which comprises maintaining a level of oxygen in the feed stream to the polymerizing zone at a level not greater than about 20 parts by weight per million parts by weight of the polymerizing mass.

In the practice of the present invention conventional temperatures are employed for the polymerization of styrene and acrylonitrile feed streams and any solvent or any additive which may be desired in the polymerization. The polymerization is then carried out at conventional temperatures and pressures as is devolatilization or separation of the volatile components in the polymerizing mass from the polymer formed. Beneficially such polymerization is carried out at temperatures from about 80° C. to about 160° C. and devolatilization at a temperature from about 180° C. to about 260° C. at an absolute pressure of 100 millimeters of mercury or less. Optionally, a conventional reinforcing rubber mass is dissolved in the styrene to produce a so-called ABS or acrylonitrile-butadiene-styrene resin. The method of the present invention is applicable to all styrene and acrylonitrile containing polymerizations with or without a free radical initiator.

It is essential and critical to the practice of the present invention and to the obtaining of polymers having a minimum yellow cast that the oxygen level in the polymerizing mass be not greater than about 20 parts by weight per million parts by weight of the polymerizing mass. Advantageously, the total molecular oxygen concentration should be maintained below about 5 and preferably below about 2 parts by weight per million parts by weight of the polymerizing mass or feed stream supplying the mass.

In the practice of the present invention generally it is desirable to deoxygenate styrene and acrylonitrile with or without a solvent such as ethyl benzene, toluene or cyclohexane with or without a dissolved rubber therein. Various methods may be employed to remove oxygen from these components. One method is by spraying the liquid into a vacuum chamber and repeating the operation until the desired level of oxygen has been obtained. Another method is to sparge a body of either the individual components or a combined feed stream with nitrogen until the desired oxygen level has been obtained. Alternatively, the feed to a first polymerization zone may be sparged with nitrogen and subsequently passed through a vacuum chamber to remove oxygen. The particular method employed in general will be dependent on the facilities available. In the preparation of a styrene and acrylonitrile containing polymer such as polymer of about 75 parts by weight styrene and 25 parts by weight acrylonitrile, employing a simple recirculating coil such as described in U.S. Pat. No. 2,769,804, wherein the effluent from the coil is heated and passed through a falling stream devolatilizer, it was observed that the partial polymer sampled before entering the devolatizer showed much less of a yellow cast than the polymer which had passed through the devolatilizer when about 45 parts per million by weight of oxygen were present in the monomer feed to the polymerizing mass. The process of the present invention is operable for the preparation of polymers wherein the styrene content varies from about 20 to 98 parts by weight and the acrylonitrile content from about 80-2 parts by weight. The process of the present invention is most advantageously employed with polymers containing from 80 to 65 parts by weight styrene and 20-35 parts by weight acrylonitrile.

By way of further illustration, a number of continuous polymerizations were conducted utilizing a recirculating coil reactor wherein the feed to the coil was 1 reactor volume per hour, the material within the coil was recirculated at about 100 reactor volumes per hour to provide a monomer to polymer conversion of about 60 weight percent and the effluent from the reactor was about 50 weight percent solvents. The feed contained 350 parts per million by weight, based on the weight of the polymerizable monomers, of 1,1-ditertiarybutyl peroxycyclohexane as polymerization initiator.

The feed to the coil reactor was about 20 weight percent ethylbenzene, the remaining 80 percent was a mixture of styrene, acrylonitrile and initiator where the styrene and acrylonitrile were present in the proportion of 70 parts by weight styrene to 30 parts by weight of acrylonitrile. The oxygen content of the feed was measured polarographically using a standard dropping mercury electrode and a saturated calomel reference electrode using the procedure set forth in the *Encylopedia of Industrial Analysis*, Volume 18, John Wiley & Sons Inc., 1974, pages 305 and 306; and the color was measured by determining the absorbance of polymer solution of 10 grams of polymer in 50 milliliters of methylene chloride at a wave length of 420 nanometers against a standard of methylene chloride. The polymerizing mixture in the reactor was maintained at a temperature of 140° C. The effluent from the reactor was devolatilized at a temperature of about 240° C. The effluent from the reactor was devolatilized to isolate the polymer and reclaim the unreacted monomer and ethyl benzene. When employing a monomer feed which contained 5 parts per million by weight of oxygen, the absorbance of the partial polymer or reactor effluent was 0.020 whereas devolatilized polymer which had been extruded and cut into granules had an absorbance of 0.087 with a correlated color grade of 7, the correlated color grade being arbitrarily a color scale wherein the larger number indicates darker yellow color and the smaller numbers indicate samples having lighter shades of yellow. With 15 parts per million of oxygen in the feed, the granules had an absorbance of 0.106 and a color grade of 9. With 43 parts per million of oxygen in the feed, the partial polymer had an absorbance of 0.026, the extruded granules an absorbance of 0.21 and a color grade of 14.5.

When the foregoing procedure was repeated with the exception that the ratio of styrene to acrylonitrile was 3:1 by weight and having an oxygen content of about 2 parts per million, the absorbance of the partial polymer was 0.018, the absorbance of the extruded granule was 0.036 and the polymer had a color grade of 2. With the same feed having oxygen content of 43 parts per million by weight of oxygen, the absorbance of the extruded granule was 0.091 and the color grade 7.

In a manner similar to the foregoing, the styrene-acrylonitrile copolymers are readily prepared.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the preparation of styrene and acrylonitrile containing polymers wherein sytrene and acrylonitrile are introduced into a recirculating polymerization zone to form a polymerizing mass, the polymerizing mass being of generally constant composition, removing a portion of the polymerizing mass from the polymerization zone, separating volatile components from the mass to thereby recover a styrene and acrylonitrile containing polymer therefrom and returning at least a portion of the volatile components to the polymerization zone, the improvement which comprises maintaining a level of oxygen in feed to the polymerizing zone at a level not greater than 20 parts by weight per million parts by weight of the polymerizing mass wherein the styrene and acrylonitrile prior to entering polymerization zone are sparged with nitrogen and/or are passed through a vacuum chamber to remove oxygen.

2. The method of claim 1 wherein the oxygen level is not greater than 5 parts per million parts by weight of the polymerizing mass.

3. The method of claim 1 wherein the oxygen level is not greater than 2 parts per million parts by weight of the polymerizing mass.

4. The method of claim 1 wherein styrene is present in a proportion of 20 to 98 parts by weight and acrylonitrile present in amount from about 2 to 80 parts by weight.

5. The method of claim 1 wherein styrene is present in a proportion of 80 to 65 parts by weight and acrylonitrile present in amount from about 20 to 35 parts by weight.

6. The method of claim 1 wherein the styrene and acrylonitrile prior to entering polymerization zone are sparged with nitrogen to remove oxygen.

7. The method of claim 1 wherein the styrene and acrylonitrile are passed through a vacuum chamber prior to entering polymerization zone to remove oxygen therefrom.

8. In a method for the preparation of styrene and acrylonitrile containing polymers and the styrene and acrylonitrile are introduced into a recirculating polymerization zone to form a polymerizing mass, the polymerizing mass being of generally constant composition, removing a portion of the polymerizing mass from the polymerization zone, separating volatile components from the mass to thereby recover a styrene and acrylonitrile containing polymer therefrom and returning at least a portion of the volatile components to the polymerization zone, the improvement which comprises maintaining a level of oxygen in feed to the polymerizing zone at a level not greater than 5 parts by weight per million parts by weight of the polymerizing mass wherein the styrene and acrylonitrile prior to entering polymerization zone are sparged with nitrogen and/or are passed through a vacuum chamber to remove oxygen.

* * * * *